(12) United States Patent
Qiu et al.

(10) Patent No.: US 10,442,897 B2
(45) Date of Patent: Oct. 15, 2019

(54) FLUOROALKYL SILICONES

(71) Applicant: 3M INNOVATIVE PROPERTIES COMPANY, St. Paul, MN (US)

(72) Inventors: Zai-Ming Qiu, Woodbury, MN (US); Jitendra S. Rathore, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 253 days.

(21) Appl. No.: 15/118,161

(22) PCT Filed: Mar. 20, 2015

(86) PCT No.: PCT/US2015/021728
§ 371 (c)(1),
(2) Date: Aug. 11, 2016

(87) PCT Pub. No.: WO2015/153152
PCT Pub. Date: Oct. 8, 2015

(65) Prior Publication Data
US 2017/0166703 A1    Jun. 15, 2017

Related U.S. Application Data

(60) Provisional application No. 61/972,680, filed on Mar. 31, 2014.

(51) Int. Cl.
| | | |
|---|---|---|
| C09D 183/08 | (2006.01) |
| C08G 77/12 | (2006.01) |
| C08G 77/24 | (2006.01) |
| C08G 77/14 | (2006.01) |
| C08G 77/08 | (2006.01) |
| C08L 83/06 | (2006.01) |
| C08L 83/08 | (2006.01) |
| C09J 7/40 | (2018.01) |

(52) U.S. Cl.
CPC ............. *C08G 77/24* (2013.01); *C08G 77/14* (2013.01); *C08L 83/06* (2013.01); *C08L 83/08* (2013.01); *C09D 183/08* (2013.01); *C09J 7/401* (2018.01); *C08G 77/08* (2013.01); *C08G 77/12* (2013.01); *C09J 2483/005* (2013.01)

(58) Field of Classification Search
None
See application file for complete search history.

(56) References Cited

U.S. PATENT DOCUMENTS

| | | |
|---|---|---|
| 2,519,983 A | 8/1950 | Simons |
| 3,159,662 A | 12/1964 | Ashby |
| 3,178,464 A | 4/1965 | Pierpoint |
| 3,220,972 A | 11/1965 | Lamoreaux |
| 3,313,773 A | 4/1967 | Lamoreaux |
| 3,410,886 A | 11/1968 | Joy |
| 3,470,225 A | 9/1969 | Knorre |
| 3,484,470 A | 12/1969 | Pittman |
| 3,567,755 A | 3/1971 | Cologne |
| 3,715,334 A | 2/1973 | Karstedt |
| 3,775,452 A | 11/1973 | Karstedt |
| 3,814,730 A | 6/1974 | Karstedt |
| 3,814,731 A | 6/1974 | Nitzsche |
| 4,276,252 A | 6/1981 | Kreis |
| 4,288,345 A | 9/1981 | Ashby |
| 4,510,094 A | 4/1985 | Drahnak |
| 4,530,879 A | 7/1985 | Drahnak |
| 4,603,215 A | 7/1986 | Chandra |
| 4,640,939 A | 2/1987 | Cavezzan |
| 4,670,531 A | 6/1987 | Eckberg |
| 4,699,813 A | 10/1987 | Cavezzan |
| 4,705,765 A | 11/1987 | Lewis |
| 4,712,092 A | 12/1987 | Boldridge, Jr. |
| 4,916,169 A | 4/1990 | Boardman |
| 5,082,706 A | 1/1992 | Tangney |
| 5,126,394 A | 6/1992 | Revis |
| 5,274,159 A | 12/1993 | Pellerite |
| 5,286,815 A | 2/1994 | Leir |
| 5,317,073 A | 5/1994 | Evans |
| 5,466,877 A | 11/1995 | Moore |
| 5,482,991 A | 1/1996 | Kumar |
| 5,578,381 A | 11/1996 | Hamada |

(Continued)

FOREIGN PATENT DOCUMENTS

| | | |
|---|---|---|
| CN | 1665769 | 9/2005 |
| CN | 101460569 | 6/2009 |

(Continued)

OTHER PUBLICATIONS

Ameduri, "Synthesis and properties of fluorosilicon-containing polybutadienes by hydrosilylation of fluorinated hydrogenosilanes. Part 1. Preparation of the silylation agents", Journal of Fluorine Chemistry, 1995, vol. 74, pp. 191-197.

(Continued)

*Primary Examiner* — Frank D Ducheneaux

(57) ABSTRACT

Described herein is a fluoroalkyl silicone comprising the following formula (I) wherein $R_1$ and $R_2$ are independently selected from an alkyl group or an aryl group; Rf is a perfluoroalkyl group or a Rf'OCHFCF$_2$ group wherein Rf' is a perfluoroalkyl group, and wherein Rf and Rf' optionally comprise at least one catenary heteroatom; X, Y, and Z are independently selected from an alkyl group, a poly(alkylene oxide) group, or a hydrolysable group, wherein at least one of X, Y, and Z is a hydrolysable group; x is an integer of at least 3; y is an integer of at least 2; and m and n are independently at least 1.

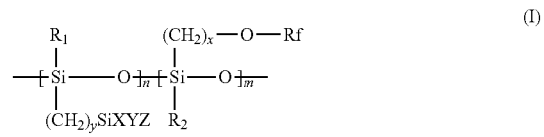

(I)

14 Claims, No Drawings

(56) References Cited

U.S. PATENT DOCUMENTS

| | | |
|---|---|---|
| 5,639,845 A | 6/1997 | Inomatat |
| 5,648,407 A | 7/1997 | Goetz |
| 5,677,050 A | 10/1997 | Bilkadi |
| 5,688,884 A | 11/1997 | Baker |
| 5,750,797 A | 5/1998 | Vitcak |
| 5,869,728 A | 2/1999 | Jenker |
| 6,129,980 A | 10/2000 | Tsukada |
| 6,204,350 B1 | 3/2001 | Liu |
| 6,255,536 B1 | 7/2001 | Worm |
| 6,299,799 B1 | 10/2001 | Craig |
| 6,329,058 B1 | 12/2001 | Arney |
| 6,353,037 B1 | 3/2002 | Thunhorst |
| 6,376,569 B1 | 4/2002 | Oxman |
| 6,462,100 B1 | 10/2002 | Thunhorst |
| 6,479,610 B1 | 11/2002 | Singh |
| 6,482,979 B1 | 11/2002 | Hintzer |
| 6,646,088 B2 | 11/2003 | Fan |
| 6,753,360 B2 | 6/2004 | Mielewski |
| 6,803,109 B2 | 10/2004 | Qiu |
| 7,056,846 B2 | 6/2006 | Clark |
| 7,199,197 B2 | 4/2007 | Caldwell |
| 7,279,210 B2 | 10/2007 | Hulteen |
| 7,407,710 B2 | 8/2008 | Qiu |
| 7,410,704 B2 | 8/2008 | Qiu |
| 7,413,807 B2 | 8/2008 | Qiu |
| 7,763,678 B2 | 7/2010 | Yamaya |
| 7,893,186 B2 | 2/2011 | Yang |
| 2005/0113609 A1 | 5/2005 | Furukawa |
| 2009/0247680 A1 | 10/2009 | Hayes |
| 2010/0126380 A1* | 5/2010 | Itami .................. B29C 33/64 106/38.25 |
| 2011/0020657 A1 | 1/2011 | Chang |
| 2011/0244226 A1 | 10/2011 | Seth |
| 2012/0052685 A1 | 3/2012 | Ogihara |
| 2012/0157703 A1 | 6/2012 | Marciniec |
| 2012/0219794 A1 | 8/2012 | Seth |

FOREIGN PATENT DOCUMENTS

| | | |
|---|---|---|
| CN | 102056994 | 5/2011 |
| EP | 0238033 | 9/1987 |
| EP | 0 469 928 | 2/1992 |
| EP | 0640644 | 3/1995 |
| EP | 1 535 892 | 6/2005 |
| GB | 2443626 | 5/2008 |
| JP | 1-226844 | 9/1989 |
| JP | 6-184312 | 7/1994 |
| JP | 2002-29921 | 1/2002 |
| WO | WO 1998-40439 | 9/1998 |
| WO | WO 2006-007917 | 1/2006 |
| WO | 2007/146603 | 12/2007 |
| WO | 2009/147283 | 12/2009 |
| WO | WO 2009-147283 | 12/2009 |
| WO | WO 2010-144352 | 12/2010 |
| WO | WO 2011-059462 | 5/2011 |
| WO | WO 2014-099497 | 6/2014 |
| WO | WO 2014-193654 | 12/2014 |
| WO | WO 2015-050740 | 4/2015 |
| WO | WO 2015-050928 | 4/2015 |

OTHER PUBLICATIONS

Childs, "Anodic Fluorination," Organic Electrochemistry, 1103-1127 (1991).

Furukawa "Reactivity of Cyclosiloxane With 3,3,4,4,5,5,6,6,6-Nonafluorohexyl Group and Its Application to Fluorosilicone Synthesis", Journal of Applied Polymer Science, Dec. 20, 2001, vol. 82, No. 13, pp. 3333-3340.

Furukawa, "Synthesis and Properties of Fluorosilicone With Perfluorooctylundecyl Side Chains", Journal of Polymer Science Part A: Polymer Chemistry, Sep. 1, 2003, vol. 41, No. 17, pp. 2704-2714.

Kobayashi, "Surface Tension of Poly [(3,3,4,4,5,5,6,6,6-nonafluorohexyl)-Methylsiloxane]", Macromolecules, 1990, vol. 23, pp. 4929-4933.

Kobler, "A Simple Synthesis of Tetraalkylammonium Salts with Functional Anions", Liebigs Annalen der Chemie, 1978, pp. 1937-1945.

Li, "Cyclizations of 5-Hexenyl, 6-Heptenyl, 7-0ctenyl, and 8-Nonenyl Radicals. The Kinetic and Regiochemical Impact of Fluorine and Oxygen Substituents11", The Journal of Organic Chemistry, Aug. 6, 1999, vol. 64, No. 16, pp. 5993-5999.

Nagase, "Electrochemical Fluorination," Fluroine Chemistry Reviews, 1967, vol. 1, No. 1, pp. 77-106.

Sneed, "The Alkali Metals," Comprehensive Inorganic Chemistry, 61-64 (1957).

International Search Report for PCT International Application No. PCT/US2015/021728 dated Jul. 10, 2015, 3 pages.

* cited by examiner

FLUOROALKYL SILICONES

CROSS REFERENCE TO RELATED APPLICATIONS

This application is a national stage filing under 35 U.S.C. 371 of PCT/US2015/021728, filed Mar. 20, 2015, which claims the benefit of U.S. Application No. 61/972680, filed Mar. 31, 2014, the disclosure of which is incorporated by reference in its/their entirety herein.

TECHNICAL FIELD

A fluoroalkyl silicone is described, along with methods of making and articles therefrom.

BACKGROUND

Pressure sensitive adhesives (PSAs) are an important class of materials. Generally, PSAs adhere to a substrate with light pressure (e.g., finger pressure) and typically do not require any post-curing (e.g., heat or radiation) to achieve their maximum bond strength. A wide variety of PSA chemistries are available. PSAs, particularly silicone PSAs offer one or more of the following useful characteristics: adhesion to low surface energy (LSE) surfaces, quick adhesion with short dwell times, wide use temperature (i.e., performance at high and low temperature extremes), moisture resistance, weathering resistance (including resistance to ultraviolet (UV) radiation, oxidation, and humidity), reduced sensitivity to stress variations (e.g., mode, frequency and angle of applied stresses), and resistance to chemicals (e.g., solvents and plasticizers) and biological substances (e.g., mold and fungi).

SUMMARY

The present disclosure relates to novel fluoroalkyl silicones and use thereof as release materials. In another aspect, the present disclosure provides release liners comprising a substrate and the release material according to the present disclosure bonded to a major surface of the substrate. In another aspect, the present disclosure providers a cross-linked or uncrosslinked coating comprising a fluoroalkyl silicone.

In one aspect, a fluoroalkyl silicone is provided having the formula I:

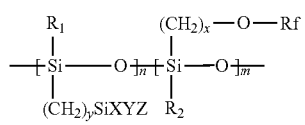

wherein
$R_1$ and $R_2$ are independently selected from an alkyl group or an aryl group;
Rf is a perfluoroalkyl group or a Rf'OCHFCF$_2$— group wherein Rf' is a perfluoroalkyl group, and wherein Rf and Rf' optionally comprise at least one catenary heteroatom;
X, Y, and Z are independently selected from an alkyl group, a poly(alkylene oxide) group, or a hydrolysable group, wherein at least one of X, Y, and Z is a hydrolysable group;
x is an integer of at least 3;
y is an integer of at least 2; and
m and n are independently at least 1.

In another aspect, a method is provided comprising method of making a fluoroalkyl silicone comprising
(i) providing:
(a) a perfluoroalkyl alkenyl ether of the formula:

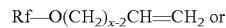

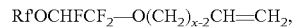

where Rf and Rf' are a perfluoroalkyl group and x is an integer of at least 3;
(b) a reactive silane of the formula:
XYZSi(CH$_2$)$_{y-2}$CH═CH$_2$, where X, Y, and Z are independently selected from an alkyl group, a poly(alkylene oxide) group, or a hydrolysable group, wherein at least one of X, Y, and Z is a hydrolysable group and y is at least 2;
(c) a hydrosilicone of the formula (IV):

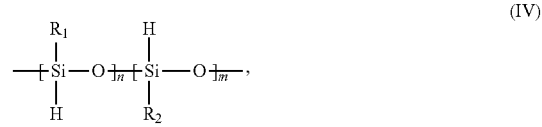

wherein each $R_1$, and $R_2$ are independently an alkyl or aryl; and
n is at least 1 and m is at least 1; and
(d) a hydrosilylation catalyst; and
(ii) hydrosilylating the perfluoroalkyl alkenyl ether and the reactive silane with the hydrosilicone in the presence of the hydrosilylation catalyst.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B).

Unless otherwise stated:
the term "alkyl" refers to a monovalent group that is a radical of an alkane and includes groups that are linear, branched, cyclic, bicyclic, or a combination thereof. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like;
the term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of alkylene groups include, but are not limited to, methylene, ethylene, 1,3-propylene, 1,2-propylene, 1,4-butylene, 1,4-cyclohexylene, and 1,4-cyclohexyldimethylene;

the term "alkoxy" refers to a monovalent group having an oxy group bonded directly to an alkyl group; and the term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

In a chemical formula, the term "Me" refers to a methyl group, the term "Pr" refers to a propyl group, the term "Et" refers to an ethyl group, and the term "Ph" refers to a phenyl group.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

A "release coating" refers to a component, preferably a film, that protects the adhesive until use and exhibits low adhesion to an adhesive, such as a PSA, so that separation can occur substantially between the adhesive and release coating interface. In tape applications, a release coating is often referred to as a "low adhesion backside," or LAB. LABs typically have a release force value of less than about 50 N/dm and can be used in adhesive tape rolls, where the tape is wound upon itself and usage requires unwinding of the tape roll. Release coatings can also be used as a "liner" for other adhesive articles, such as labels or medical dressing bandages, where the adhesive article is generally supplied as a sheet-like construction, as opposed a roll-like construction.

Fluorinated release coatings are often used with PSAs, particularly silicone PSAs, to provide desired release properties. In some embodiments, the desired release force is no greater than 50 g/25 mm, e.g., no greater than 30 g/25 mm at 180 degrees peel angle and 230 cm/min (90 inches/min). However, the selection of fluorinated release coatings available to achieve the desired release performance is limited, particularly for wet-cast (e.g., solvent-based, water-based, and hot melt coated) PSAs. For example, few release materials provide stable, consistent, smooth release of an adhesive.

The most common fluorinated release coatings are fluorosilicone materials with pendent $R_fCH_2CH_2$— group made from $R_f$—CH=$CH_2$, wherein $R_f$ is typically a $CF_3$— or a $CF_3CF_2CF_2CF_2$— group. However, commercially available fluorosilicone release coatings are typically more expensive. The reasons for high cost of commonly used fluorosilicone release materials are believed to relate to a) the lower reactivity of $R_fCH=CH_2$ which results in low yield of the hydrosilylation reaction, and b) to the preparation from expensive $R_f$—I with two steps, i) addition to ethylene to form $R_f$—$CH_2CH_2$—I and ii) elimination of HI.

The present disclosure provides novel fluoroalkyl silicones that can be used as release materials or can also be blended with one or more additional low surface energy materials (e.g., fluoropolymers, polyacrylates with pendent $R_f$ group, lower cost fluoroalkyl silicones and non-fluorinated silicones) while maintaining the desired low release characteristics of the instant fluorosilicone material. In addition, in some embodiments, high blend ratios of these low surface energy materials may be used without detrimentally affecting the re-adhesion force of the adhesive after removal of the blended release materials comprising the present fluorosilicones.

Applicants have identified reactive fluorinated alkenes for high yield of hydrosilylation products (from hydrosilicones) and subsequently providing novel fluoroalkyl silicones having similar or better performance to current products at reduced cost.

The present disclosure provides fluoroalkyl silicones of the formula (I)

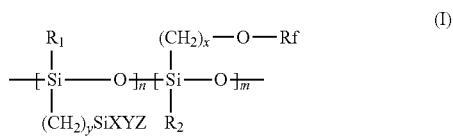

wherein $R_1$ and $R_2$ are independently selected from an alkyl group or an aryl group;

Rf is a perfluoroalkyl group or a Rf'OCHFCF$_2$— group wherein Rf' is a perfluoroalkyl group, and wherein Rf and Rf' optionally comprise at least one catenary heteroatom;

X, Y, and Z are independently selected from an alkyl group, a poly(alkylene oxide) group, or a hydrolysable group, wherein at least one of X, Y, and Z is a hydrolysable group;

x is an integer of at least 3;

y is an integer of at least 2; and m and n are independently at least 1.

In one embodiment, $R_1$ and $R_2$ independently comprise 1, 2, 3, 4, 5, 6, 7, 8, 9, or even 10 carbon atoms. Exemplary $R_1$ and $R_2$ groups include: —$CH_3$, —$CH_2CH_3$, —$CH_2CH_2CH_3$, and —$C_5H_6$. $R_f$ and XYZ groups are discussed in more detail below. In one embodiment n is at least 1, 2, 5, 10, 20, 50, or even 100; and at most 500, 750, 1000, 1500, 2000, 2500, 3000, 4000, or even 5000. In one embodiment m is at least 1, 2, 3, 4, 5, 10, 20, 25, 50, or even 100; and at most 300, 500, 750, 1000, 1500, 2000, 2500, 3000, 4000, or even 5000. The ratio of n to m may be at least 95 to 5, 80 to 20, 70 to 30, or even 60 to 40; and at most 2 to 98, 10 to 90, 20 to 80, 30 to 70, or even 40 to 60.

In one embodiment, the flouroalkyl silicone of formula (I) further comprises at least one segment Q.

In one embodiment, the segment Q has the structure:

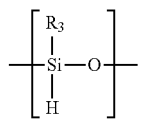

where $R_3$ is selected from an alkyl group or an aryl group.

In one embodiment, the segment Q has the structure:

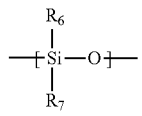

Wherein $R_6$ and $R_7$ are each independently selected from an alkyl group or an aryl group, for example —$CH_3$, —$CH_2CH_3$, and —$CH_2CH_2CH_3$.

In yet another embodiment, the segment Q has the structure:

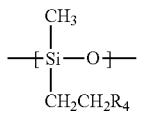

Wherein $R_4$ is a C1 to C50 alkyl group.

In the fluoroalkyl silicone of Formula (I), various segments of Q defined above can be present along the polymer backbone. These segments typically randomly occur in the polymer backbone. In one embodiment, at least one segment is present, however more segments (for example, at least 5, 10, 20, 50, 100, or even 200) may be included along the polymer backbone. These Q segments may be added to reduce cost of the fluoroalkyl silicone, make the fluoroalkyl silicone more compatible with non-silicone containing hydrocarbon systems, and/or added for crosslinking functionality or for reaction sites for subsequent chemical reactions. Typically, the amount of Q segments should be limited so that the performance of the novel fluoroalkyl silicone of Formula (I) is not substantially affected.

In one embodiment, the disclosed fluoroalkyl silicones of Formula (I) may contain a pendent or terminal group of formula —$(C_3H_6)$—OR$f''$ group, wherein R$f''$ is a perfluoroalkyl group comprising one to 6 carbon atoms, preferably in a carbon chain. In some embodiments, the pendent or terminal group may further contain reactive hydrosilane groups (—$SiR_9H$—O—) and dialkyl silane groups (—$SiR_8R_9$—O—), wherein the alkyl groups, $R_8$ and $R_9$, of the silicone can be chains comprising 16 to 50 carbon atoms.

Method

The fluoroalkyl silicone of Formula (I) is the hydrosilylation reaction product of a (i) perfluoroalkyl alkenyl ether and (ii) a reactive silane with a hydrosilicone in the presence of a hydrosilylation catalyst.

The perfluoroalkyl alkenyl ether of the present disclosure is that of formula (II):

$$R_f—O(CH_2)_{x-2}CH=CH_2 \quad (II)$$

where $R_f$ is a perfluoroalkyl group or a Rf'OCHFCF$_2$— group with Rf' being a perfluoroalkyl group, and x is an integer of at least 3. The perfluoroalkyl group comprises 1, 2, 3, 4, 5, 6, 7, or even 8 carbon atoms. Rf and Rf' may optionally comprise at least one catenary heteroatom, such as O, N, or S. When x is 3, the perfluoroalkyl alkenyl ether is an allyl ether compound.

In one embodiment, Rf and Rf' are independently selected from —$CF_3$, —$CF_2CF_3$, —$CF_2C_2F_5$, —$CF_2C_3F_7$, —$CF_2C_4F_9$, —$CF_2C_5F_{11}$, $CF_3O(CF_2)_2CF_2$—, $(CF_3)_2N(CF_2)_2CF_2$—, —$CF_2CF(CF_3)_2$, and $C_3F_7OCF(CF_3)CF_2$—.

Exemplary perfluoroalkyl alkenyl ethers include, but are not limited to: $CF_3OCH_2CH=CH_2$, $CF_3CF_2OCH_2CH=CH_2$, $CF_3CF_2CF_2OCH_2CH=CH_2$, $CF_3CF_2CF_2CF_2OCH_2CH=CH_2$, $(CF_3)_2CFCF_2OCH_2CH=CH_2$, $CF_3CF_2CF_2CF_2CF_2OCH_2CH=CH_2$, $(CF_3)_2CFCF_2CF_2OCH_2CH=CH_2$, $CF_3CF_2CF_2CF_2CF_2CF_2OCH_2CH=CH_2$, $(CF_3)_2CFCF_2CF_2CF_2OCH_2CH=CH_2$, $(CF_3)_2NCF_2CF_2CF_2OCH_2CH=CH_2$, $CF_3OCHFCF_2OCH_2CH=CH_2$, $CF_3CF_2OCHFCF_2OCH_2CH=CH_2$, $CF_3CF_2CF_2OCHFCF_2OCH_2CH=CH_2$, $CF_3OCF_2CF_2CF_2OCHFCF_2OCH_2CH=CH_2$, $CF_3CF_2CF_2OCHFCF_{20}(CH_2)_2CH=CH_2$, $CF_3CF_2CF_2OCHFCF_{20}(CH_2)_3CH=CH_2$, $CF_3CF_2CF_2OCHFCF_{20}(CH_2)_4CH=CH_2$, $CF_3CF_2CF_2OCHFCF_{20}(CH_2)_8CH=CH_2$ and $CF_3CF_2CF_2OCHFCF_{20}(CH_2)_9CH=CH_2$.

In one embodiment, the perfluoroalkyl alkenyl ethers may be prepared as described in US20050113609 (Furukawa).

In another embodiment, the perfluoroalkyl alkenyl ethers may be prepared by the allylation of a perfluorinated acid fluoride, in the presence of fluoride ion, with an allyl compound and or by dissociation of perfluorinated carboxylic acid esters (which can be prepared from the corresponding hydrocarbon or partially-fluorinated carboxylic acid esters by direct fluorination with fluorine gas). Such techniques are known in the art, see for example U.S. Pat. Prov. Appl. No. 61/829,577 (filed 31 May 20131).

The reactive silane of the present disclosure is that of the formula (III):

$$XYZSi(CH_2)_{y-2}CH=CH_2 \quad (III)$$

where X, Y, and Z are independently selected from an alkyl group, a poly(alkylene oxide) group, or a hydrolysable group, wherein at least one of X, Y, and Z is a hydrolysable group;

and y is an integer of at least 2. The alkyl group may contain 1, 2, 3, 4, 5, or even 6 carbon atoms. The poly(alkylene oxide) group may contain 1, 2, 3, 4, 5, or even 6 carbon atoms. The hydrolysable group is selected from RO—, Cl—, and RC(O)O— wherein R is an alkyl group having 1 to 4 carbon atoms. In one embodiment, X, Y, and Z are independently selected from an —Cl, $CH_3O$—, $C_2H_5O$—, $C_3H_7O$—, $CH_3C(O)O$—, and $C_2H_5C(O)O$—.

Exemplary reactive silanes include, but are not limited to: $(MeO)_3SiCH=CH_2$, $(EtO)_3SiCH=CH_2$, $(MeO)_2Si(Me)CH=CH_2$, $(EtO)_2Si(Me)CH=CH_2$, $(MeO)Si(Me)_2CH=CH_2$, $(EtO)Si(Me)_2CH=CH_2$, $(Cl)_3SiCH=CH_2$, $(MeCO_2)_3SiCH=CH_2$, $(n\text{-}PrO)_3SiCH=CH_2$, $(i\text{-}PrO)_3SiCH=CH_2$, $(n\text{-}PrO)_2Si(Me)CH=CH_2$, $(i\text{-}PrO)_2Si(Me)CH=CH_2$, $(n\text{-}PrO)Si(Me)_2CH=CH_2$, $(i\text{-}PrO)Si(Me)_2CH=CH_2$, $(MeO)_3SiCH_2CH=CH_2$, $(EtO)_3SiCH_2CH=CH_2$, $(MeO)_2Si(Me)CH_2CH=CH_2$, $(EtO)_2Si(Me)CH_2CH=CH_2$, $(MeO)Si(Me)_2CH_2CH=CH_2$, $(EtO)Si(Me)_2CH_2CH=CH_2$, $(Cl)_3SiCH_2CH=CH_2$, $(n\text{-}PrO)_3SiCH_2CH=CH_2$, $(i\text{-}PrO)_3SiCH_2CH=CH_2$, $(n\text{-}PrO)_2Si(Me)CH_2CH=CH_2$, $(i\text{-}PrO)_2Si(Me)CH_2CH=CH_2$, $(n\text{-}PrO)Si(Me)_2CH_2CH=CH_2$, $(i=PrO)Si(Me)_2CH_2CH=CH_2$, $(MeO)_3SiCH_2CH_2CH=CH_2$, and $(MeO)_3SiCH_2CH_2CH_2CH=CH_2$.

The hydrosilicone of the present disclosure is that of formula (IV):

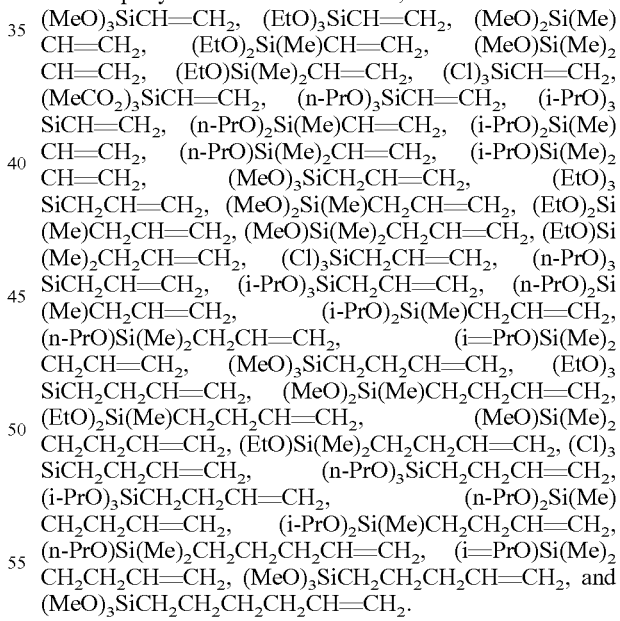

wherein n is at least one and m is at least 1, and $R_1$ and $R_2$ are independently selected from an alkyl group or an aryl group. The definitions of $R_1$ and $R_2$, n and m are the same as those for the resulting fluoroalkyl silicone of Formula 1. In one embodiment, the ratio of n to m may be at least 95 to 5 and at most 2 to 98. The hydrosilicone of Formula (IV) may comprise additional segments, Q, as described above. Further the hydrosilicone of Formula (IV) may comprise the pendent or terminal groups as described above.

The fluoroalkyl silicone of Formula I is prepared, in part, with at least one hydrosilicone having a plurality of Si—H groups as represented by Formula IV. Examples of useful Si—H group containing hydro silicones include hydride terminated polydimethylsiloxanes having the formula $HMe_2SiO(SiMe_2O)_n SiMe_2H$ (CAS 70900-21-9); hydride terminated methylhydrosiloxane-dimethylsiloxane copolymers having the formula $HMe_2SiO(SiMe_2O)_n(SiMeH—O)_q SiMe_2H$ (CAS 69013-23-6); trimethylsiloxane terminated polyethylhydrosiloxanes having the formula $Me_3SiO(SiMeHO)_q SiMe_3$ (CAS 63148-57-2); trimethylsiloxane terminated methylhydrosiloxane-dimethylsiloxane copolymers having the formula $Me_3SiO(SiMe_2O)_n(SiMeHO)_q SiMe_3$ (CAS 68037-59-2); triethylsiloxane terminated polyethylhydrosiloxanes having the formula $Et_3SiO(SiEtHO)_q SiEt_3$ (CAS 24979-95-1); hydride terminated poly(phenyl-dimethylhydrosiloxysiloxanes) having the formula $HSiMe_2O(SiPh(OSiMe_2H)O)_q SiMe_2H$; all commercially available from vendors such as, for example, Gelest, Inc. or Dow Corning Corp.

In the presence of the hydrosilylation catalyst, the compounds of perfluoroalkyl alkenylethers of Formula II and the reactive silane of Formula III are hydrosilylated by the hydrosilicone of Formula IV to produce the fluoroalkyl silicones of Formula I. All or a portion of the Si—H groups may undergo the hydrosilylation with the compounds of Formula II and III.

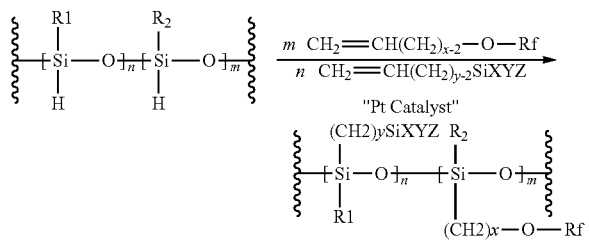

In one embodiment, the hydrosilylation reaction of the hydrosilicone with the perfluoroalkyl alkenyl ether and a reactive silane is a one pot, one step synthesis, with the perfluoroalkyl alkenyl ether and reactive silane added simulataneously, either separately or as a pre-mix of the components. In another embodiment, the reaction is a two step synthesis, perhaps done in a single pot, with the addition of the perfluoroalkyl alkenyl ether and hydrosilicone reacted first, followed by the addition and subsequent reaction with the reactive silane or vise versa.

The ratio of the perfluoroalkyl alkenyl ether of Formula (II) to the hydrosilicone of Formula (IV) is not particularly limited, but the perfluoroalkyl alkenyl ether is generally from 0.3 to 0.99 equivalent, or 0.4 to 0.9 equivalent to the hydrosilicone.

The ratio of the reactive silane of Formula (III) to the hydrosilicone of Formula (IV) is not particularly limited, but the reactive silane is generally from 0.05 to 0.9 equivalent, or 0.1 to 0.7 equivalent to the hydrosilicone.

In one embodiment, an excess of the hyrdosilicone is used in the hydrosilylation reaction as compared to the reactive silane and the perfluoroalkyl alkenyl ether, such that the resulting fluoroalkyl silicone comprises at least one hydrosilicone (—Si—H) along the polymer backbone.

Since the reactive silane and the perfluoralkyl alkenyl ether both react with the H—Si groups of the hydrosilane, if $R_1$ and $R_2$ are different, the resulting polymer may comprise a mixture of segments (for example, some perfluoroalkyl alkenyl ether reacting with the $[SiH(R_2)O]$ segment and the reactive silane reacting with the $[SiH(R_1)O]$ segment) depending on the reaction rates of the various reactions and the order in which the reactive silane and perfluoroalkyl alkenyl ether is added.

In one embodiment, the reaction further comprises a compound of the formula $CH_2=CH—R_4$, where $R_4$ is C1-C50 alkyl group. This compound can be reacted with the Si—H groups in the composition in the presence of a hydrosilylation catalyst, resulting in the hydrogen atom being replaced by the $R_4$ alkyl group.

Regarding the hydrosilylation reaction, numerous patents teach the use of various complexes of cobalt, rhodium, nickel, palladium, or platinum as catalysts for hydrosilylation reactions. For example, U.S. Pat. No. 4,288,345 (Ashby et al) discloses as a catalyst for hydrosilylation reactions a platinum-siloxane complex. Additional platinum-siloxane complexes are disclosed as catalysts for hydrosilylation reactions in U.S. Pat. Nos. 3,715,334, 3,775, 452, and 3,814,730 (Karstedt et al). U.S. Pat. No. 3,470,225 (Knorre et al) discloses production of organic silicon compounds by addition of a compound containing silicon-bonded hydrogen to organic compounds containing at least one non-aromatic double or triple carbon-to-carbon bond using a platinum compound of the empirical formula $PtX_2(RCOCR'COR'')_2$ wherein X is halogen, R is alkyl, R' is hydrogen or alkyl, and R" is alkyl or alkoxy.

The catalysts disclosed in the foregoing patents are characterized by their high catalytic activity. Other platinum complexes for accelerating the aforementioned thermally-activated addition reaction include: a platinacyclobutane complex having the formula $(PtCl_2C_3H_6)_2$ (U.S. Pat. No. 3,159,662, Ashby); a complex of a platinous salt and an olefin (U.S. Pat. No. 3,178,464, Pierpoint); a platinum-containing complex prepared by reacting chloroplatinic acid with an alcohol, ether, aldehyde, or mixtures thereof (U.S. Pat. No. 3,220,972, Lamoreaux); a platinum compound selected from trimethylplatinum iodide and hexamethyldiplatinum (U.S. Pat. No. 3,313,773, Lamoreaux); a hydrocarbyl or halohydrocarbyl nitrile-platinum (II) halide complex (U.S. Pat. No. 3,410,886, Joy); a hexamethyldipyridine-diplatinum iodide (U.S. Pat. No. 3,567,755, Seyfried et al); a platinum curing catalyst obtained from the reaction of chloroplatinic acid and a ketone having up to 15 carbon atoms (U.S. Pat. No. 3,814,731, Nitzsche et al); a platinum compound having the general formula $(R')PtX_2$ where R' is a cyclic hydrocarbon radical or substituted cyclic hydrocarbon radical having two aliphatic carbon-carbon double bonds, and X is a halogen or alkyl radical (U.S. Pat. No. 4,276,252, Kreis et al); platinum alkyne complexes (U.S. Pat. No. 4,603,215, Chandra et al.); platinum alkenyl-cyclohexene complexes (U.S. Pat. No. 4,699,813, Cavezzan); and a colloidal hydrosilylation catalyst provided by the reaction between a silicon hydride or a siloxane hydride and a platinum (0) or platinum (II) complex (U.S. Pat. No. 4,705,765, Lewis).

Although these platinum complexes and many others are useful as catalysts in processes for accelerating the hydrosilylation, processes for promoting the ultraviolet or visible radiation-activated addition reaction between these compounds may be preferable in some instances. Platinum complexes that can be used to initiate ultraviolet radiation-activated hydrosilylation reactions have been disclosed, e.g., platinum azo complexes (U.S. Pat. No. 4,670,531, Eckberg); (η4-cyclooctadiene)diarylplatinum complexes (U.S. Pat. No. 4,530,879, Drahnak); and (η5-cyclopentadienyl)trialkylplatinum complexes (U.S. Pat. No. 4,510,094, Drahnak). Other compositions that are curable by ultraviolet radiation include those described in U.S. Pat. Nos. 4,640,939 and 4,712,092 and in European Patent Application No. 0238033. U.S. Pat. No. 4,916,169 (Boardman et al) describes hydrosilylation reactions activated by visible radiation. U.S. Pat. No. 6,376,569 (Oxman et al.) describes a process for the actinic radiation-activated addition reaction of a compound containing silicon-bonded hydrogen with a compound containing aliphatic unsaturation, said addition being referred to as hydrosilylation, the improvement comprising using, as a platinum hydrosilylation catalyst, an (η5-cyclopentadienyl) tri(σ-aliphatic)platinum complex, and, as a reaction accelerator, a free-radical photoinitiator capable of absorbing actinic radiation, i.e., light having a wavelength ranging from about 200 nm to about 800 nm. The process can also employ, as a sensitizer, a compound that absorbs actinic radiation, and that is capable of transferring energy to the aforementioned platinum complex or platinum complex/free-radical photoinitiator combination, such that the hydrosilylation reaction is initiated upon exposure to actinic radiation. The process is applicable both to the synthesis of low molecular weight compounds and to the curing of high molecular weight compounds, i.e., polymers.

Combinations of the hydrosilylation catalysts and photocatalysts and/or curing methods may also be used.

The catalyst is typically present in an amount that is effective to catalyze the hydrosilylation reaction. More typically, the catalyst is present in amounts sufficient to provide as little as one part of catalyst, or less, per million parts of the Si—H groups of the silicone polymer. On the other hand, amounts of the catalyst sufficient to provide as high as 1 to 10, or more, parts of catalyst per 1,000 parts of the Si—H groups of the silicone polymer may also be used. All or a portion of the Si—H groups may be functionalized with the perfluoroalkyl group.

In the presence of the hydrosilylation catalyst, hydrosilylation of hydrosilicone of Formula IV with the compounds of Formula II and III readily produce the fluoroalkyl silicones of Formula I in high yield under mild conditions, such as at room temperature. The fluoroalkyl ether of formula II demonstrated high reactivity to hydrosilicones, and the exothermic reaction may be controlled by slowly addition of hydrosilicone into the solution of fluoroalkyl alkenyl ether and catalyst without solvent, or by diluting the reaction with a solvent. In contrary, almost no product was observed from $C_4F_9CH=CH_2$ under similar conditions, indicating the significantly higher reactivity of perfluoroalkyl alkenyl ether in comparison with perfluoroalkylethylene.

In one embodiment, the hydrosilyation reaction is done in the absence of a solvent. In another embodiment, the hydrosilation reaction is done in the presence of a solvent. Typically the solvent is a non-polar solvent such as hexane, heptanes, and toluene. Other useful solvents are halogenated solvents, such as chloroform, $CH_2Cl_2$ or fluorinated solvent, such as those available by 3M Co., St. Paul, Minn. under the trade designation "3M NOVEC", exemplary fluorinated solvents include $C_4F_9OCH_2CH_3$ and $C_3F_7OCH_3$.

In one embodiment, the hydrosilation reaction is conducted at a room temperature, however the temperature can be controlled between at least 20, 23, 25, 30, or even 35° C.; at most 70, 80, 90, 100, 150, 200, or even 220° C.

Fluoroalkyl Silicone

The fluoroalkyl silicone of Formula I have a Mw (weight average molecular weight) of at least 200, preferably at least 400. In some embodiments, the Mw may be 1000 or greater. In some embodiments, the Mw may be limited to 1,000,000 or less; preferably limited to 500,000 or less. In some embodiments, n and m are each greater than two and where the ratio of n to m is from 95/5 to 2/98. In some embodiments, the ratio of n to m is from 80/20 to 10/90. In some embodiments, the ratio of n to m is less than one, preferably the ratio of n to m is less than ½.

In one embodiment, the fluoroalkyl silicone of the present disclosure is

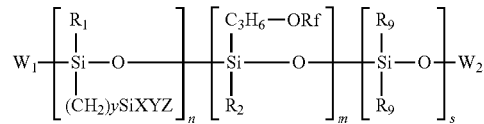

wherein n and m are independently at least 1; s may be zero or at least 1;
$R_1$ and R2 are independently selected from an alkyl group or an aryl group; Rf is a perfluoroalkyl group or a Rf'OCH-$FCF_2$- group wherein Rf' is a perfluoroalkyl group, and wherein Rf and Rf' optionally comprise at least one catenary heteroatom;
X, Y, and Z are independently selected from an alkyl group, a poly(alkylene oxide) group, or a hydrolysable group, wherein at least one of X, Y and Z is a hydrolysable group;
$W_1$ is —$R_9$ or —O—Si($R_9$)($R_9$)($R_9$);
$W_2$ is —$R_9$ or —Si($R_9$)($R_9$)($R_9$);
where $R_9$ is independently selected from H, alkyl, aryl or —($C_3H_6$)—$R_4$; and where $R_4$ is $C_1$-$C_{50}$ alkyl with the proviso that the fluoroalkyl silicone contains at least one —($C_3H_6$)—$R_4$ group. In one embodiment n is 1 to 2000 and m is 1 to 2000.

In another embodiment the fluoroalkyl silicone of the present disclosure is

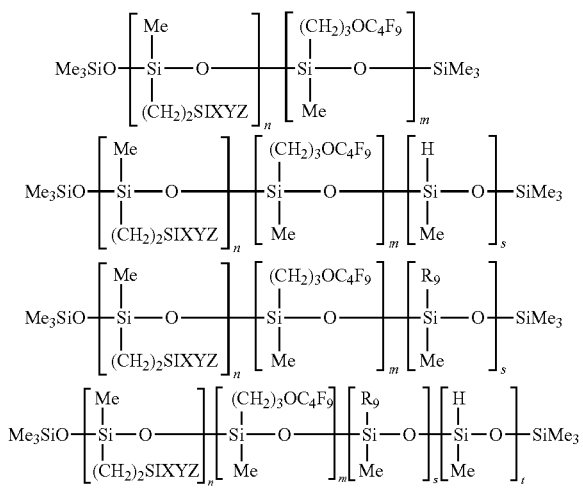

Wherein n, m, s and t are independently at least one; $R_9$ is alkyl group or an aryl group having a $C_1$-$C_{50}$ carbon chain.

Blending

In one embodiment, the fluoroalkyl silicone of Formula I can be blended with one or more additional polymers, for example to lower cost or adjust performance characteristics.

In one embodiment, additional low surface energy materials (e.g., a fluoropolymer or silicone) can be blended with the fluoroalkyl silicone, while maintaining the desired low release characteristics of the fluorosilicone material, even when the additional low surface energy material itself is not a release material. In addition, in some embodiments, high blend ratios may be used without detrimentally affecting the readhesion force of the adhesive after removal of a blended composition comprising the fluoroalkyl silicone of the present disclosure. Exemplary low surface energy materials that may be blended with the fluoroalkyl silicone of Formula I include additional fluorosilicone polymers, as well as fluoropolymers and non-fluorinated silicones.

Generally, any known fluorosilicone release polymer may be used. The term "fluorosilicone" means a silicone material comprising at least some fluorine atoms on a pendent groups (i.e. fluoroalkyl). Exemplary fluorosilicone release coatings include release coating compositions derived from organopolysiloxanes having fluorine containing organic groups and alkenyl groups an organohydrogensiloxane crosslinking agent and a platinum-containing catalyst. Other fluorosilicone release coatings may be derived from, e.g., organopolysiloxanes having fluorine containing organic groups and silicon-bonded hydrogen groups, an alkenyl functional organopolysiloxane and a platinum-containing catalyst.

A number of useful commercially available fluorosilicone polymers are available from Dow Corning Corp. (Midland, Mich.) under the SYL-OFF and the SYL-OFF ADVANTAGE series of trade designations including, e.g., SYL-OFF Q2-7785 and SYL-OFF Q2-7786. These fluorosilicone polymers are particularly useful in forming release coating compositions when combined with a suitable crosslinking agent. One useful crosslinking agent is available under the SYL-OFF Q2-7560 trade designation from Dow Corning Corp. Other useful crosslinking agents are disclosed in U.S. Pat. No. 5,082,706 (Tangney) and U.S. Pat. No. 5,578,381 (Hamada et al.). Other fluorosilicone polymers are commercially available from General Electric Co. (Albany, N.Y.), Wacker Chemie (Germany), Akrosil (Menasha, Wis.), and Loparex (Willowbrook, Ill.). Other fluorosilicone polymers are available from Momentive (FSR2000), and Siliconature (Scotchpak 9741 and M117)

Fluoropolymers can be prepared from a wide variety of fluorinated ethylenes and non-fluorinated monomers. As used herein, the term "fluorinated" includes both perfluorinated and partially-fluorinated materials.

One class of fluoropolymers is based upon fluorinated olefinic monomers such as tetrafluoroethylene (TFE), hexafluoropropylene (HFP), vinyl fluoride (VF), vinylidene and fluoride (VDF). In some embodiments, the fluoroolefin-based fluoropolymers may be homopolymers or copolymers of fluorinated olefinic monomers. In some embodiments, the fluoroolefin-based fluoropolymers may be copolymers of one or more fluorinated olefinic monomers and one or more other monomers, including, e.g., non-fluorinated olefins such as ethylene, chlorinated olefins such as chlorotrifluoroethylene, and fluorinated vinyl ethers such as trifluoromethylvinylether.

In some embodiments, the fluoroolefin-based polymers may be amorphous fluoropolymers. As used herein, amorphous fluoropolymers are materials that exhibit essentially no crystallinity or possess no significant melting point as determined for example by differential scanning calorimetry (DSC). In some embodiments, the amorphous fluoropolymers are elastomeric. In some embodiments the elastomeric fluoropolymers may comprise, e.g., interpolymerized units derived from VDF, HFP, and, optionally, TFE monomers. Examples of such are commercially available from 3M Co. under the trade designation "3M DYNEON FLUOROELASTOMER FC 2145" and "3M DYNEON FLUOROELASTOMER FT 2430". Additional amorphous fluoropolymers include, e.g., vinylidene fluoride-chlorotrifluoroethylene copolymers, commercially available under the trade designation "3M KEL-F 3700" from 3M Co.

In some embodiments, the fluoroolefin-based polymers may be homopolymers and copolymers that do exhibit crystalline melting point. Exemplary crystalline fluoropolymers include those based on fluorinated monomers such as TFE or VDF such as polyvinylidene fluoride (PVDF), available commercially from 3M Company as "3M DYNEON PVDF", or thermoplastic copolymers of tetrafluoroethylene such as those based on the crystalline microstructure of TFE-HFP-VDF, e.g., those available from 3M Co. under the trade designation "3M DYNEON FLUOROPLASTIC THV 220".

In some embodiments, the fluoroolefin-based polymers may include PVDF-containing fluoroplastic materials having very low molar levels of HFP such as those sold under the trade designation "3M DYNEON FLUOROPLASTIC PVDF 6010" or "3M DYNEON FLUOROPLASTIC PVDF 3100", available from 3M CO.; and "KYNAR 740PVDF", "KYNAR FLEX 2800" and "KYNAR 9301", available from Elf Atochem North America Inc.

A separate class of fluoropolymers useful in some embodiments of the present disclosure are fluoroacrylate polymers, which are based upon (meth)acrylates (i.e., acrylates and/or methacrylates) having pendant fluoroalkyl groups. Fluoroacrylate polymers derived from fluoroacrylate monomers and multi-(meth)acrylates such a polyethylene glycol diacrylate (PEGDA) or 1,6-hexanediol diacrylate (HDDA) will form nonlinear (e.g., branched and/or crosslinked) fluoropolymers. Fluoroacrylate polymers derived from fluoroacrylate monomers and mono-(meth)acrylates such as C1-C50 acrylates (e.g., C4-C20 acrylates such as butyl acrylate, isooctyl acrylate, 2-ethylhexyl acrylate, and octadecyl acrylate) form linear fluoropolymers.

Such fluoroacrylate monomers can be polymerized to yield a fluorinated acrylic polymer as described in U.S. Pat. No. 7,199,197 (Caldwell et al.) and U.S. Pat. No. 7,297,210 (Qui et al.). The fluoroacrylate monomers can also be copolymerized with one or more comonomers such as mono-(meth)acrylate monomers to produce linear fluoropolymers according to some embodiments of the present disclosure. In some embodiments, the comonomer may be an alkyl mono-(meth)acrylate. In some embodiments, the alkyl mono-(meth)acrylate is a C1-C50, e.g., a C4 to C20, alkyl mono-(meth)acrylate. Representative examples of useful alkyl mono-(meth)acrylates include methyl(meth)acrylate, butyl(meth)acrylate, isobutyl (meth)acrylate, hexyl (meth)acrylate, dodecyl(meth)acrylate, octadecyl(meth) acrylate, and 2-ethylhexyl(meth)acrylate.

The ratio of fluoroalkyl silicone of Formula I to fluoropolymer (e.g., linear fluoroacrylate polymer or fluoroolefinic polymer) can vary widely. For example, in some embodiments, the weight ratio of the fluoroalkyl silicone of Formula I to the linear fluoropolymer is no greater than 10:1, no greater than 5:1, or even no greater than 3:1. In some embodiments, it may be desirable to minimize the amount of the relatively expensive fluoroalkyl silicone of Formula I, while retaining the required release and readhesion properties. In some embodiments, the weight ratio of the fluoroalkyl silicone of Formula I to the linear fluoropolymer is no greater than 1:1, no greater than 1:5, no greater than 1:10, or even no greater than 1:20. For example, in some embodiments the weight ratio of the fluoroalkyl silicone of Formula I to the linear fluoropolymer is between 10:1 and 1:20, e.g., between 3:1 and 1:20, inclusive; between 2:1 and 1:10, inclusive (e.g., between 1:1 and 1:10, inclusive), or even between 2:1 and 1:3.

In other embodiments, the fluoroalkyl silicone of Formula I may be blended with non-fluorinated silicone polymers, including vinyl-substituted, hydrogen (Si—H) substituted silicone polymers, and non-functional silicone polymers. Vinyl-substituted and hydrogen-substituted (Si—H) silicone polymers are described in U.S. Pat. No. 7,279,210 (Qiu et al.), incorporated herein by reference.

Coatings

The present disclosure further provides coating compositions comprising the fluoroalkyl silicone of Formula I. The term "coatable" or "coatable composition" refers to either (i) the neat composition, which is a liquid at room temperature or upon heating; or (ii) the composition is dissolved and/or dispersible in solvent (e.g., water and/or an organic solvent); which are substantially gel-free and, that it can be applied to a substrate using standard coating methods, and that it forms a film upon heating or curing.

The coatable compositions are preferably diluted or dispersed in a liquid (for example, water and/or an organic solvent) before coating a substrate. Preferably, the coating compositions contain from about 5 to about 100 percent solids (more preferably, about 10 to about 50 percent), based upon the desired weight of the coating composition needed to achieve a designed performance.

In one embodiment, for a low temperature photo-curable coating composition, one or more photo-acid generators may be added in 0.5% to 10% by weight to the fluoroalkyl silicone of Formula (I).

The coatable composition may contain various additives, according to necessity, in addition to the fluoroalkyl silicone of Formula (I). The additives, such as another polymer (described above), a defoaming agent, a thickener, a surfactant, a lubricant, organic particles, inorganic particles, an antioxidant, an ultraviolet ray absorber, a dye, a pigment, another polymer compound, and a cross-linking agent, may be contained in ranges that do not impair the object of the present disclosure.

The coatable compositions of the disclosure can be applied to a wide variety of substrates. The coatable composition may be applied to at least a portion of at least one major surface (typically the entire surface) of suitable flexible or inflexible support material (or substrate). In one embodiment, a primer known in the art can be utilized to aid in the adhesion of the release coating to the support material.

The coatable compositions can be applied to fibrous substrates (for example, woven, knit, and non-woven fabrics, textiles, carpets, leather, or paper) to impart water- and oil-repellency. The coatable compositions can be applied to a substrate (or articles comprising a substrate) by standard methods such as, for example, spraying, padding, dipping, roll coating, brushing, or exhaustion.

The coatable compositions are useful as release coatings, and can be applied to surfaces requiring release properties from adhesives. Surprisingly, dried coatable compositions of the disclosure show significant solvent resistance. The coatable compositions can therefore be used as release coatings for solvent cast adhesives.

Substrates suitable for release coatings include, for example, paper, metal sheets, foils, non-woven fabrics, polyolefin coated paper, and films of thermoplastic resins such as polyesters, polyamides, polyolefins, polycarbonates, and polyvinyl chloride. Release coating compositions can be applied to suitable substrates by conventional coating techniques such as, for example, wire-wound rod, direct gravure, offset gravure, reverse roll, air-knife, and trailing blade coating. The resulting release coating compositions can provide effective release for a wide variety of pressure sensitive adhesives such as, for example, natural rubber based adhesives, silicone based adhesives, acrylic adhesives, and other synthetic film-forming elastomeric adhesives.

The coating thickness of the coatable composition may vary from 0.1 (or less) micrometers (μm) to as thick as desired. Preferably, the release layer is less than about 5 μm thick. More preferably, the release layer is less than about 3 μm thick. After application of the coatable composition onto the substrate, the article can then be dried to remove any remaining water or solvent. In one embodiment, the coated composition is heated to a temperature between about 100° C. and about 220° C. for drying or curing.

Curing of the Fluoroalkyl Silicone

The fluoroalkyl silicones of Formula (I) of the present disclosure can be cured via water (e.g., moisture) or by photolysis.

In one embodiment, the fluroalkyl silicone can be cured via the reactive silane (i.e., the —SiXYZ moiety) either through moisture hydrolysis, following by dehydration or under photoirradiation in the presence of a photo-acid generator. In one embodiment, the fluoroalkyl silicone is able to cross-link with itself via the reactive silane.

The fluoroalkyl silicones of the present disclosure may be cured using radiation treatments as known in the art, for example, UV radiation, e-beam radiation, or infrared radiation radiation. Exemplary UV (e.g., typically 150-400 nm) sources include: e.g., low-pressure mercury vapor lamps (e.g., emitting at about 185 nm). Typically the article comprising the fluoroalkyl silicone and photo-acid generator is exposed to the UV radiation for a sufficient amount of time such that a strong acid is generated from the photo-acid generator, which initiates a cure reaction of the reactive silane group resulting in crosslinking of the composition.

A wide variety of photo acid generating materials can be used in the practice of the invention to catalyze the moisture curing reaction, including onium salts such as sulfonium and iodonium salts. Activating the acid generating material liberates an acid that initiates and accelerates crosslinking of the moisture-curable composition through the formation of Si—O—Si crosslinks. Activation may be accomplished by irradiating the composition with, for example, ultraviolet, visible light, electron beam or microwave radiation. While heat may be used to activate the acid generating material, the compositions of the disclosure advantageously do not require this and thereby can avoid undesirable damage to heat sensitive substrates.

Although the photo-acid generating material described above is preferred due to the controlled curability it provides, it has been found that condensation catalysts, such as strong organic acids, weak Lewis acids, weak organic bases and metal chelates can also be used in the preparation of the novel silicone pressure-sensitive adhesive. Another preferred class of condensation catalyst is the strong organic acids having pKa values of less than about 3 and the anhydrides and ammonium salts thereof described in U.S. Pat. No. 5,286,815. Examples of useful strong organic acids and derivatives include trichloroacetic acid, cyanoacetic acid, malonic acid, nitroacetic acid, dichloroacetic acid, difluoroacetic acid, trichloroacetic anhydride, dichloroacetic anhydride, difluoroacetic arthydride, triethylammonium trichloroacetate, trimethylammonium trichloroacetate, and mixtures thereof.

The condensation catalyst or an acid generating material is used in amounts of about 0.5 to about 20 parts by weight, based on 100 parts by weight of the fluoroalkyl silcone.

In one embodiment, the fluoroalkyl silicones comprising an additional curable Si—H group (e.g., from a partial hydrosilylation of hydrosilicone) may be used as a cross-linking agent, such as to thermally crosslink silicones or fluorinated silicones having a plurality of ethylenically unsaturated bonds in a subsequent hydrosilylation reaction. In some embodiments, the fluoroalkyl silicone comprising a Si—H group may be subsequently crosslinked by vinyl substituted silicones: i.e. silicone having a plurality of vinyl groups. For example non-fluorinated organopolysiloxane polymers(vinyl silicones) comprising an average of at least two ethylenically unsaturated organic groups can be cross-linked with the fluoroalkyl silicones of the present disclosure. In some embodiments, the non-fluorinated organopolysiloxane polymer has a vinyl equivalent weight of no greater than 60,000 grams per equivalent, e.g., no greater than 20,000, or even no greater than 10,000 grams per equivalent. In some embodiments, the non-fluorinated organopolysiloxane polymer has a vinyl equivalent weight of 2000 to 5000 grams per equivalent, e.g., 2000 to 4000 grams per equivalent, or even 2500 to 3500 grams per equivalent. An exemplary non-fluorinated organopolysiloxane polymers include those comprising a triorganosiloxy endblocked polydiorganosiloxane polymer.

In one embodiment, the fluoroalkyl silicone of Formula (I) contains both the —SiXYZ group as well as a —SiH group. In one embodiment, the fluoroalkyl silicone can be dual curable, which may be controllably cured initially via Si—H with a vinyl silicone, then moisture or photo-acid cured using the —SiXYZ group or vice versa.

In one embodiment, a coating comprising the fluoroalkyl silicone of the present disclosure is applied to at least one major surface of a substrate and then cured to form a release liner, which is then contacted with a pressure-sensitive adhesive, wherein the cured coating is in intimate contact with the pressure sensitive adhesive. PSAs known in the art could be used, for example a silicone-containing adhesive, and acrylate-containing adhesive. In one embodiment, a second substrate is contacted with the pressure sensitive adhesive, opposite the cured coating to form, for example, a tape construction.

Advantageously, in one embodiment, the fluoroalkyl silicones of the present disclosure are radiation-curable enabling the ability to control when the cure reaction occurs. The fluoroalkyl silicones of the present disclosure can provide low surface energy, and has sufficient and stable release properties for adhesive applications, for example, and minimal "carryover" into the adhesive with the adhesive exhibiting good readhesive characteristics after contact with the fluoroalkyl silicone coating composition.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: EW=equivalent weight fpm=feet per minute, FT-IR=Fourier Transform infrared, g=gram, kg=kilograms, min=minutes, mol=mole; cm=centimeter, meq=milliequivalents, mm=millimeter, ml=milliliter, L=liter, NMR=nuclear magnetic resonance, and wt=weight.

Materials:

$C_3F_7OCHFCF_2OCH_2CH=CH_2$ was made by similar procedure as described in Example 1 of U.S. Pat. Publ. No. 20050113609 (Furukawa) except from $C_3F_7OCF=CF_2$ and $HOCH_2CH=CH_2$ were used as the starting materials with $CH_3OCH_2CH_2OCH_3$ as solvent.

$C_4F_9$—O—$CH_2CH=CH_2$ was made from $C_3F_7C(O)F$ and $CH_2=CHCH_2Br$ by similar procedure as described in J. Org. Chem., 1999, 64, 5993 by Anrong Li et al., in making $ICF_2CF_2CF_2OCH_2CH=CH_2$ from $ICF_2CF_2C(O)F$ and $BrCH_2CH=CH_2$. $C_4F_9$— is a mixture of n-$C_4F_9$— and i-$C_4F_9$— in mole ratio of 57/43.

$CH_2=CHSi(OCH_2CH_3)_3$ was purchased from Sigma-Aldrich Chemical Co.

"SYL-OFF 7048" is a 100 weight percent solids silicone crosslinker (said to comprise methylhydrogen cyclosiloxane, Viscosity-30 centistokes) having H—Si equivalent weight of 60, obtained from Dow Corning Corp., Midland, Mich., under the trade designation "SYL-OFF 7048".

"SYL-OFF 7678" is a 100 weight percent solids silcone crosslinker (said to comprise dimethyl siloxane and methylhydrogen siloxane in unit ratio of 34 to 66, Viscosity-30 centistokes) having H—Si equivalent weight of ~65, obtained from Dow Corning Corp., Midland, Mich., under the trade designation "SYL-OFF 7678".

"Pt-Cat" (Karstedt catalyst) was bis(1,3-divinyl-1,1,3,3-tetrametyldisiloxane) platinum(0) (2 wt % platinum in xylene), purchased from Gelest Inc., Morrisville, Pa. and kept in the dark before use.

Method for Release Test

Release Test: An IMASS SP2000 slip peel tester (obtained from IMASS Inc., Accord, Mass.) was used for all release tests. Tests were performed at 21° C. at 50% relative humidity. A piece of 2.54 cm wide cellophane tape with a high tack rubber adhesive (available under the trade designation "SCOTCH PREMIUM CELLOPHANE TAPE 610", 3M Co., St. Paul, Minn.) was laminated to the silicone-coated PET film of Examples 4 or 5 with a 2 kg rubber roller. Then the cellophane tape was peeled at an angle of 180° at the speed of 2.29 m per minute in 5 seconds. Typically, 3 measurements were made and the mean reported.

Release Test on Stainless Steel: The cellophane tape peeled in the Release Test above was laminated to a stainless steel plate with a 2 kg rubber roller. An IMASS SP2000 slip peel tester was used to peel the cellophane tape at an angle of 180° at the speed of 30 cm per minute in 10 seconds. Typically, 3 measurements were made and the mean reported.

Method for Determining Contact Angle

Coated films prepared in Examples and Coated Examples described below were rinsed for 1 minute with hand agitation in an isopropanol (IPA) bath prior to water and hexadecane (HD) contact angles measurements. Measurements were made using a VCA-2500XE video contact angle analyzer (available from AST Products, Billerica, Mass.). Reported values are the average (ave.) of at least 3 drops; each drop was measured twice. Drop volumes were 5 µL for static measurements and 1-3 µL for advancing and receding. For HD, only advancing and receding contact angles are reported because static and advancing values were found to be nearly equal.

Examples

Example 1: Preparation of —[SiMe($C_3H_6$OCHF$CF_2$O$C_3F_7$)—O]n-[SiMe($CH_2$)$_2$Si(OEt)$_3$—O]m-, n/m=70/30

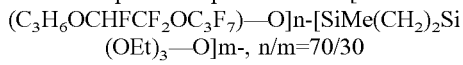

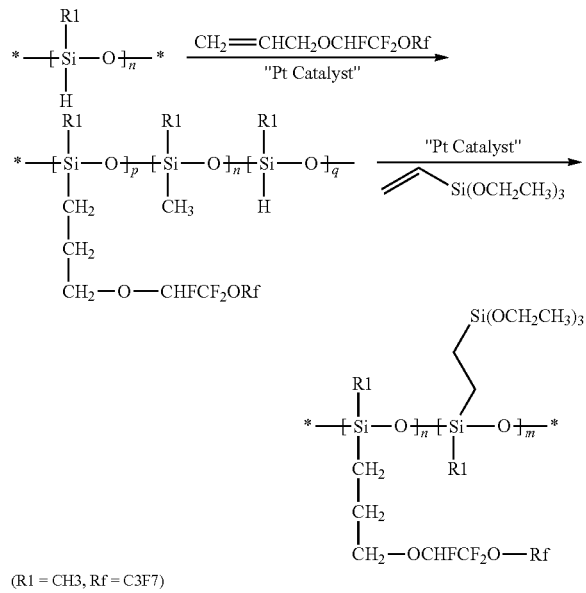

(R1 = CH3, Rf = C3F7)

Karstedt catalyst (80 ppm, ~4 mg 2% solution in xylene) and $C_3F_7$OC$F_2$CHFOC$H_2$CH=C$H_2$ (11 g, MW=324, 33.95 mmol) was mixed together in 100 mL round bottom flask followed by drop-wise addition of SYL-OFF 7048 (2.3 g, EW ~60, 38.3 meq) through a dropping funnel at room temperature. The addition of SYL-OFF 7048 resulted in the evolution of heat after 20-60 seconds of stirring. The mixture was stirred for additional 30 minutes followed by the addition of excess vinyltriethoxysilane (5 g, MW=190.31, 26.27 mmol). The mixture then was stirred at 50° C. for 4 hrs. Analysis of the resulting mixture was performed by FT-IR (Si—H at ~2160 cm$^{-1}$ disappeared) and $^1$H NMR (Si—H at δ=4.5 ppm disappeared). To isolate the product, any unreacted residual of $C_3F_7$OC$F_2$CHFOC$H_2$CH=C$H_2$ and vinyltriethoxysilane was evaporated under reduced pressure. Product yield was 99% and the ratio of n:m was about 70:30 as determined by $^1$H-NMR analysis. Chemical shift of $^1$H-NMR: 5.8-5.9 (broad split peak); 3.9 (b); 1.76 (b), 1.47 (b), 1.02 (broad), 0.63 (broad), 0.24 (broad, —SiCH$_3$) ppm.

Example 2: Preparation of —[SiMe$_2$O—]n-SiMe($C_3H_6$OCHF$CF_2$O$C_3F_7$)—O]p-[SiMe($CH_2$)$_2$Si(OEt)$_3$—O]q-, n/p/q=55/30/15

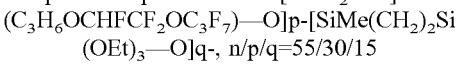

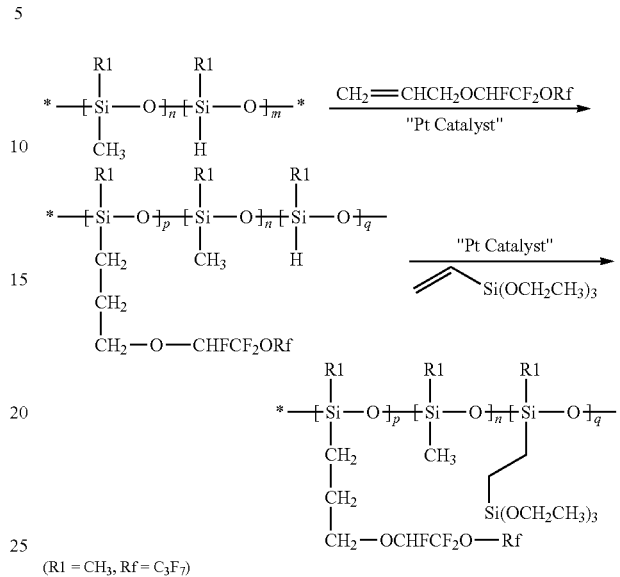

(R1 = CH$_3$, Rf = C$_3$F$_7$)

Karstedt catalyst (80 ppm, ~4 mg 2% solution in xylene) and $C_3F_7$OC$F_2$CHFOC$H_2$CH=C$H_2$ (9 g, MW=324, 27.78 mmol) was mixed together in 100 mL round bottom flask followed by drop wise addition of the SYL-OFF 7678 (2.3 g, EW (equivalent weight) ~64.67 based on NMR analysis, 35.56 meq) through a dropping funnel at room temperature. The addition of SYL-OFF 7678 resulted in the evolution of heat after 20-60 seconds of stirring. The mixture was stirred for an additional 30 minutes followed by the addition of excess vinyltriethoxysilane (5 g, MW=190.31, 26.27 mmol). The mixture then was stirred at 50° C. for 4 hrs. Analysis of resulting mixture was performed by FT-IR (Si—H at ~2160 cm$^{-1}$ disappeared) and $^1$H NMR (Si—H at δ=4.5 ppm disappeared). To isolate the product, any unreacted residual $C_3F_7$OC$F_2$CHFOC$H_2$CH=C$H_2$ and vinyltriethoxysilane was evaporated under reduced pressure. Product yield was 99% and the ratio of p:n:q was about 30:55:15 as determined by $^1$H-NMR analysis. Chemical shift of $^1$H-NMR: 5.8-5.9 (broad split peak); 3.9 (b); 1.76 (b), 1.47 (b), 1.02 (broad), 0.67 (broad); 0.22 (broad, —SiCH$_3$) ppm.

Example 3a: Preparation of —[SiMe($C_3H_6$O$C_4F_9$)—O]n-[SiMe($CH_2$)$_2$Si(OEt)$_3$—O]m-, n/m=80/20

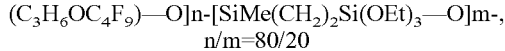

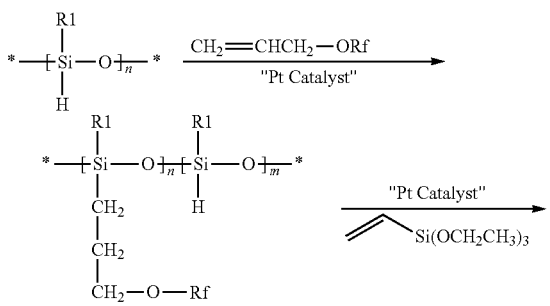

-continued

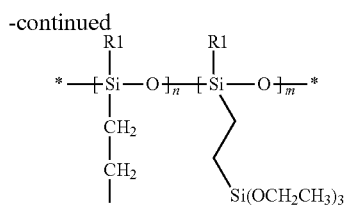

(R1 = CH$_3$, Rf = C$_3$F$_7$)

Karstedt catalyst (80 ppm, ~4 mg 2% solution in xylene) and C$_4$F$_9$OCH$_2$CH=CH$_2$ (9 g, MW=276, 32.60 mmol) was mixed together in 100 mL round bottom flask followed by drop wise addition of the SYL-OFF 7048 (2.3 g, EW ~60, 38.33 meq) through a dropping funnel at room temperature. The addition of SYL-OFF 7048 resulted in the evolution of heat after 20-60 seconds of stirring. The mixture was stirred for additional 30 minutes followed by the addition of excess vinyltriethoxysilane (5 g, MW=190.31, 26.27 mmol). The mixture then was stirred at 50° C. for 4 hrs. Analysis of the resulting mixture was performed by FT-IR (Si—H at ~2160 cm$^{-1}$ disappeared) and $^1$H NMR (Si—H at δ=4.5 disappeared) ppm. To isolate the product, any unreacted residual C$_4$F$_9$OCH$_2$CH=CH$_2$ and vinyltriethoxysilane was evaporated under reduced pressure. Product yield was 98% and the ratio of n:m was about 80:20 as determined by $^1$H-NMR analysis. Chemical shift of $^1$H-NMR: 3.81 (broad, —OCH$_2$); 1.59 (b), 1.24 (b), 0.82 (broad), 0.45 (broad); 0.01 (broad, —SiCH$_3$) ppm.

Example 3 b: Preparation of —[SiMe (C$_3$H$_6$OC$_4$F$_9$)—O]n-[SiMe(CH$_2$)$_2$Si(OEt)$_3$—O]m- (n/m=80/20) in One Step Process

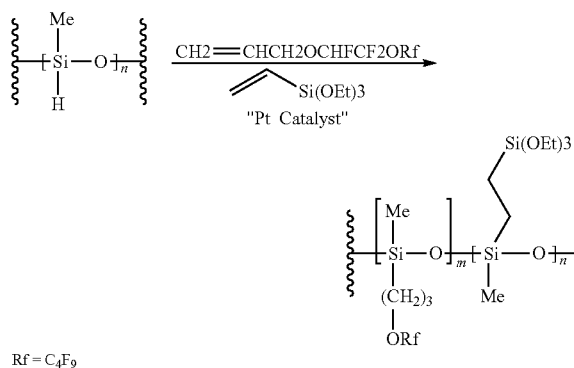

Rf = C$_4$F$_9$

Karstedt catalyst [80 ppm, ~4 mg 2% solution in xylene], C$_4$F$_9$OCH$_2$CH=CH$_2$ (9 g, MW=276, 32.60 mmol) and vinyltriethoxysilane (1.55 g, MW=190.31, 8.15 mmol) were mixed together in a 100 mL round bottom flask followed by drop wise addition of the SYL-OFF 7048 (2.42 g, EW ~60, 40.33 meq) through a dropping funnel at room temperature. The addition of SYL-OFF 7048 results in the evolution of heat after 20-60 seconds of stirring. The mixture was continued to be stirred for additional 30 minutes. Then, the mixture was reacted at 70° C. for 4 hrs. Analysis of mixture was performed by FT-IR (Si—H at ~2160 cm$^{-1}$ disappeared) and 1H NMR (Si—H at ~4.5 ppm disappeared). To isolate the product, any unreacted residual C$_4$F$_9$OCH$_2$CH=CH$_2$ and vinyltriethoxysilane was evaporated under reduced pressure. Yield-98% and the ratio of n:m is around 80:20 as determined by 1H-NMR analysis. Chemical shift of 1H-NMR: 3.81 (broad, —OCH$_2$); 1.59 (b), 1.24 (b), 0.82 (broad), 0.45 (broad); 0.01 (broad, —SiCH$_3$) ppm.

Example 4: Preparation of —[SiMe (C$_3$H$_6$OCHFCF$_2$OC$_3$F$_7$)—O]n-[SiMe(CH$_2$)$_2$Si(OEt)$_3$—O]m-[SiMeH—O]p-, n/p/q=70/20/10

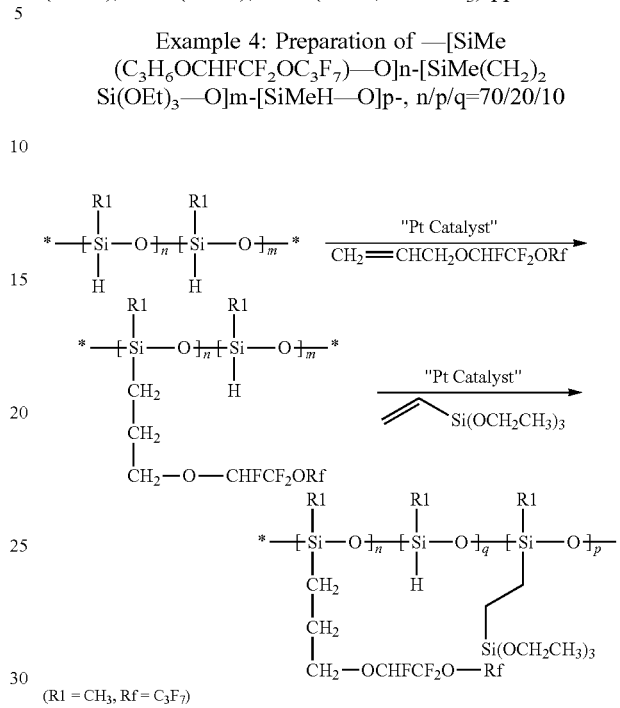

(R1 = CH$_3$, Rf = C$_3$F$_7$)

Karstedt catalyst [80 ppm, ~4 mg 2% solution in xylene] and C$_3$F$_7$OCF$_2$CHFOCH$_2$CH=CH$_2$ (8.86 g, MW=MW=324, 27.34 mmol) was mixed together in a 100 mL round bottom flask followed by drop addition of the SYL-OFF 7048 (2.5 g, EW ~60, 41.67 meq) through a additional funnel at room temperature. The addition of SYL-OFF 7678 resulted in the evolution of heat after 20-60 seconds of stirring. The mixture was reacted for additional 30 minutes followed by the addition of vinyltriethoxysilane (1.58 g, MW=190.31, 8.30 mmol). The mixture was stirred at 50° C. for 4 hrs. To isolate the product, any unreacted residual of C$_3$F$_7$OCF$_2$CHFOCH$_2$CH=CH$_2$ and vinyltriethoxysilane was evaporated under reduced pressure. Yield-99% and the ratio of n:q:p was determined to be 70:10:20 as determined by $^1$H-NMR analysis. Chemical shift of $^1$H-NMR: 5.8-5.9 (broad split peak); 4.7 (Si—H); 3.9 (b); 1.76 (b), 1.47 (b), 1.02 (broad), 0.67 (broad); 0.22 (broad, —SiCH$_3$) ppm.

Coating Formulation-1 (F-1):

Fluorosilicone of Example 1 was dissolved in a mixed solvent of heptanes and ethyl acetate (80/20 ratio by weight) to yield a 10 wt % solids solution of the fluoroalkyl silicone.

Photoinitiator UVR-6976, a 50% solids solution of triarylsulphonium hexafluoroantimonate in propylene carbonate is available from Union Carbide Corp., Houston, Tex. under the trade designation "CYRACURE UVR-6976".

The photoinitiator solution (above) was mixed with the 10% solids solution of the fluoroalkyl silicone (above), to yield an 8% by weight photoinitiator solution.

The resulting formulation was coated onto a 2-mil (0.058 millimeter (mm)) thick polyester terephthalate (PET) film (obtained from Mitsubishi Polyester Film, Greer, S.C., under the trade designation "HOSTAPHAN 3SAB", which was primed on one side to improve the adhesion of the silicone coatings) with No#12 Mayer wire rods. The coating was dried at 120° C. for 2 minutes in an oven equipped with solvent exhaust, followed by exposure of the coated film under a D-bulb UV light at 20 fpm for two times.

The release of the cured coatings to the adhesive side of the cellophane tape (above) and the Release Test and Release Test on Stainless Steel described above were preformed. The results are summarized in Table 1.

Coating Formulation-2 (F-2):

The same procedure as described in F-1 was followed except, the coating formulation comprised 13.2 g solution of the 8% by weight photoinitiator solution from F-1 above and 0.13 g of an additional crosslinker, $(EtO)_3Si(CH_2)_8Si(OEt)_3$ (available from Gelest Inc., Morrisville, Pa.).

Comparative Example A (CE-A)

Cellophane tape with a high tack rubber adhesive (available under the trade designation "SCOTCH PREMIUM CELLOPHANE TAPE 610", 3M Co., St. Paul, Minn.) was laminated to a stainless steel plate and tested with a 2 kg rubber roller without contacting with any release liner. An IMASS SP2000 slip peel tester was used to peel the cellophane tape at an angle of 180° at the speed of 30 cm per minute in 10 seconds. Typically, 3 measurements were made and the mean reported.

Comparative Example B (CE-B)

The commercially available silicone release coating made from:

"SYL-OFF Q2-7785" is a vinyl functionalized fluorosilicone with pendent $C_4F_9CH_2CH_2$— supplied as an ~80 wt % solution of the polymer in heptane obtained from Dow Corning Corp., under the trade designation "SYL-OFF Q2-7785" and "SYL-OFF Q2-7560" is a hydrosilane functionalized fluorosiloxane crosslinker with pendent $C_4F_9CH_2CH_2$— obtained from Dow Corning Corp., under the trade designation "SYL-OFF Q2-7560". (cured via hydrosilylation from hydrosilane and vinylsilane)

A 10% solution in heptanes was prepared comprising a 33/1 weight ratio of "SYL-OFF Q2-7785" to "SYL-OFF Q2-7560".

The resulting formulation was coated onto a 2-mil (0.058 millimeter (mm)) thick polyester terephthalate (PET) film (obtained from Mitsubishi Polyester Film, Greer, S.C., under the trade designation "HOSTAPHAN 3SAB", which was primed on one side to improve the adhesion of the silicone coatings) with No#12 Mayer wire rods. The coating was dried and cured at 120° C. for 2 minutes in an oven equipped with solvent exhaust.

The release of the cured coatings to the adhesive side of the cellophane tape (above) and the Release Test and Release Test on Stainless Steel described above were preformed. The results are summarized in Table 1.

Shown in Table 1 are the results for the Release Test and Release Test on Stainless Steel. Examples 4 and 5 and Comparative Example B showed a smooth peel when peeled from the cellophane tape in the Release Test.

TABLE 1

| Example | Trial | Release Test g/in (g/cm) | Release Test on Stainless Steel g/in (g/cm) |
|---|---|---|---|
| F-1 | 1 | 10.0 (3.94) | 661.4 (260.4) |
|  | 2 | 7.5 (2.95) | 613.6 (241.6) |
|  | 3 | 12.1 (4.76) | 674.0 (2.65.4) |
|  | Average | 9.9 (3.90) | 649.7 (255.8) |
| F-2 | 1 | 10.4 (4.1) | 644.0 (253.5) |
|  | 2 | 8.2 (3.2) | 658.8 (259.4) |
|  | 3 | 7.7 (3.0) | 627.4 (247.0) |
|  | Average | 8.8 (3.5) | 643.4 (253.3) |

TABLE 1-continued

| Example | Trial | Release Test g/in (g/cm) | Release Test on Stainless Steel g/in (g/cm) |
|---|---|---|---|
| CE-A | 1 | Not tested | 756.2 (297.7) |
|  | 2 | Not tested | 760.6 (299.4) |
|  | 3 | Not tested | 735.1 (289.4) |
|  | Average | Not tested | 750.6 (295.5) |
| CE-B | 1 | 6.4 (2.5) | 601.9 (237.0) |
|  | 2 | 7.3 (2.9) | 623.0 (245.3) |
|  | 3 | 7.7 (3.0) | 621.6 (244.7) |
|  | Average | 7.1 (2.8) | 615.5 (242.3) |

The cured silicone coatings on the PET backing were tested for the contact angles in IPA and HD using the Method described above. The results are summarized in Tables 2A and 2B below.

TABLE 2A

|  | Water | | | | | |
|---|---|---|---|---|---|---|
|  | Advancing | | Receding | | Static | |
| Example | Left | Right | Left | Right | Left | Right |
| F-1 | 117.1 | 117.1 | 100.9 | 100.9 | 113.7 | 113.7 |
|  | 117.0 | 117.0 | 101.0 | 101.0 | 113.6 | 113.6 |
|  | 116.4 | 116.4 | 101.4 | 101.4 | 113.3 | 113.3 |
| Ave. | 116.8 | 116.8 | 101.1 | 101.1 | 113.5 | 113.5 |
| F-2 | 117.0 | 117.0 | 99.9 | 99.9 | 114.5 | 114.5 |
|  | 117.4 | 117.4 | 100.4 | 100.4 | 114.2 | 114.2 |
|  | 117.3 | 117.3 | 99.0 | 99.0 | 114.8 | 114.8 |
| Ave. | 117.2 | 117.2 | 99.8 | 99.8 | 114.5 | 114.5 |
| CE-B | 117.1 | 117.1 | 96.9 | 96.9 | 114.2 | 114.2 |
|  | 116.7 | 116.7 | 97.7 | 97.7 | 114.5 | 114.5 |
|  | 117.4 | 117.4 | 96.9 | 96.9 | 114.8 | 114.8 |
| Ave. | 117.1 | 117.1 | 97.2 | 97.2 | 114.5 | 114.5 |

TABLE 2B

|  | Hexadecane | | | | | |
|---|---|---|---|---|---|---|
|  | Advancing | | Receding | | Static | |
| Coating | Left | Right | Left | Right | Left | Right |
| F-1 | 61.0 | 61.0 | 44.6 | 44.6 | 51.2 | 51.2 |
|  | 61.5 | 61.5 | 44.0 | 44.0 | 51.3 | 51.3 |
|  | 61.0 | 61.0 | 44.1 | 44.1 | 50.9 | 50.9 |
| Ave. | 61.2 | 61.2 | 44.2 | 44.2 | 51.1 | 51.1 |
| F-2 | 58.6 | 58.6 | 46.5 | 46.5 | 50.6 | 50.6 |
|  | 58.6 | 58.6 | 45.3 | 45.3 | 50.0 | 50.0 |
|  | 58.3 | 58.3 | 45.2 | 45.2 | 50.0 | 50.0 |
| Ave. | 58.5 | 58.5 | 45.7 | 45.7 | 50.2 | 50.2 |
| CE-B | 48.2 | 47.5 | 33.8 | 33.9 | 44.1 | 43.1 |
|  | 48.4 | 47.4 | 33.7 | 32.7 | 44.5 | 43.3 |
|  | 48.3 | 47.4 | 32.8 | 31.9 | 44.5 | 43.2 |
| Ave. | 48.3 | 47.4 | 33.4 | 32.8 | 44.4 | 43.2 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A fluoroalkyl silicone comprising the following formula:

$$\begin{array}{c} R_1 \\ | \\ -\!\!\!-\!\!\!\!\begin{array}{c}Si\!-\!O\end{array}\!\!\!\!\!-\!\!\!\!\!{}_n \\ | \\ (CH_2)_y SiXYZ \end{array} \begin{array}{c} (CH_2)_x\!-\!O\!-\!Rf \\ | \\ -\!\!\!\!\begin{array}{c}Si\!-\!O\end{array}\!\!\!\!\!-\!\!\!\!{}_m \\ | \\ R_2 \end{array} \quad (I)$$

wherein $R_1$ and $R_2$ are independently selected from an alkyl group or an aryl group;

Rf is a perfluoroalkyl group optionally comprising at least one catenary heteroatom, or Rf is a Rf'OCHFCF$_2$- group wherein Rf' is a perfluoroalkyl group optionally comprising at least one catenary heteroatom;

X, Y, and Z are independently selected from an alkyl group, a poly(alkylene oxide) group, or a hydrolysable group, wherein at least one of X, Y, and Z is a hydrolysable group;

x is an integer of at least 3;

y is an integer of at least 2; and m and n are independently an integer of at least 1.

2. The fluoroalkyl silicone of claim 1, wherein the hydrolysable group is selected from RO—, Cl—, and RC(O)O— wherein R is an alkyl group having 1 to 4 carbon atoms.

3. The fluoroalkyl silicone of claim 1, wherein, X, Y, and Z are independently selected from an —Cl, CH$_3$O—, C$_2$H$_5$O—, C$_3$H$_7$O—, CH$_3$C(O)O—, and C$_2$H$_5$C(O)O—.

4. The fluoroalkyl silicone of claim 1, wherein the fluoroalkyl silicone further comprises a segment-[Q]-, wherein Q is selected from:

(a) formula $$-\!\!\!\!\left[\begin{array}{c}R_3 \\ | \\ Si\!-\!O \\ | \\ H\end{array}\right]\!\!\!\!-$$

wherein $R_3$ is selected from an alkyl group or an aryl group;

(b) formula $$-\!\!\!\!\begin{array}{c}CH_3 \\ | \\ Si\!-\!O \\ | \\ CH_3\end{array}\!\!\!\!-;$$

and (c) formula $$-\!\!\!\!\begin{array}{c}CH_3 \\ | \\ Si\!-\!O \\ | \\ CH_2CH_2R_4\end{array}\!\!\!\!-$$

wherein $R_4$ is a C1 to C50 alkyl group.

5. The fluoroalkyl silicone of claim 1, wherein the ratio of n to m is from 95/5 to 2/98.

6. The fluoroalkyl silicone of claim 1, wherein Rf and Rf' are independently selected from —CF$_3$, —CF$_2$CF$_3$, —CF$_2$C$_2$F$_5$, —CF$_2$C$_3$F$_7$, —CF$_2$C$_4$F$_9$, —CF$_2$C$_5$F$_{11}$, CF$_3$O(CF$_2$)$_2$CF$_2$—, (CF$_3$)$_2$N(CF$_2$)$_2$CF$_2$—, —CF$_2$CF(CF$_3$)$_2$, and C$_3$F$_7$OCF(CF$_3$)CF$_2$—.

7. The fluoroalkyl silicone of claim 1, wherein the fluoroalkyl silcone comprises at least one pendent or terminal group of —(C$_3$H$_6$)—O—Rf" wherein Rf" is perfluoroalkyl group.

8. A cured composition comprising a cured form of the fluoroalkyl silicone of claim 1.

9. A release liner comprising a substrate and a layer of a cured coating of the fluoroalkyl silicone of claim 1 coated on at least one major surface of the substrate.

10. A coatable release solution comprising the fluoroalkyl silicone of claim 1 and a solvent.

11. The coatable release solution of claim 10, further comprising a non-fluorinated organopolysiloxane polymer or a linear fluoropolymer.

12. An adhesive article comprising:
(i) a release liner comprising a substrate and a coating composition thereon, wherein the coating composition comprises a cured product of the fluoroalkyl silicone of claim 1; and
(ii) a pressure-sensitive adhesive in contact with the coating composition.

13. The adhesive article according to claim 12, wherein the pressure-sensitive adhesive comprises an adhesive selected from a silicone adhesive and an acrylate adhesive.

14. A curable composition comprising the fluoroalkyl silicone of claim 1 and at least one of a photoinitiator.

* * * * *

UNITED STATES PATENT AND TRADEMARK OFFICE
CERTIFICATE OF CORRECTION

Page 1 of 3

PATENT NO. : 10,442,897 B2
APPLICATION NO. : 15/118161
DATED : October 15, 2019
INVENTOR(S) : Zai-Ming Qiu et al.

It is certified that error appears in the above-identified patent and that said Letters Patent is hereby corrected as shown below:

On the Title Page

Column 2
Other Publications, Line 1, Delete "fluorosilicon-" and insert -- fluorosilicone- --, therefor.
Other Publications, Line 2, Delete "hydrogenosilanes." and insert -- hydrogensilanes. --, therefor.

Page 2, Column 2
Other Publications, Line 17, Delete "7-0ctenyl," and insert -- 7-Octenyl, --, therefor.
Other Publications, Line 21, Delete "Fluroine" and insert -- Fluorine --, therefor.

In the Specification

Column 1
Line 8, Delete "61/972680," and insert -- 61/972,680, --, therefor.

Column 4
Line 46, Delete "flouroalkyl" and insert -- fluoroalkyl --, therefor.

Column 5
Line 28, Delete "perfluroalkyl" and insert -- perfluoroalkyl --, therefor.

Column 6
Line 12, Delete "and or" and insert -- and/or --, therefor.

Column 7
Line 52, Delete "simulataneously," and insert -- simultaneously, --, therefor.
Line 58, Delete "vise" and insert -- vice --, therefor.

Signed and Sealed this
Tenth Day of December, 2019

Andrei Iancu
*Director of the United States Patent and Trademark Office*

Column 8
Line 1, Delete "hyrdosilicone" and insert -- hydrosilicone --, therefor.
Line 6, Delete "perfluoralkyl" and insert -- perfluoroalkyl --, therefor.

Column 9
Line 59, Delete "hydrosilyation" and insert -- hydrosilylation --, therefor.
Line 61, Delete "hydrosilation" and insert -- hydrosilylation --, therefor.

Column 10
Line 1, Delete "hydrosilation" and insert -- hydrosilylation --, therefor.
Line 27, Delete "R2" and insert -- $R_2$ --, therefor.
Line 39, Delete "—($C_3H_6$)—$R_4$,and" and insert -- —($C_3H_6$)—$R_4$, and --, therefor.

Column 14
Line 27, Delete "fluroalkyl" and insert -- fluoroalkyl --, therefor.
Line 35, Delete "radiation radiation." and insert -- radiation. --, therefor.

Column 15
Line 2, Delete "dichioroacetic" and insert -- dichloroacetic --, therefor.
Line 3, Delete "arthydride," and insert -- anhydride, --, therefor.
Line 8, Delete "silcone." and insert -- silicone. --, therefor.

Column 16
Line 38, Delete "silcone" and insert -- silicone --, therefor.
Line 46, Delete "tetrametyldisiloxane)" and insert -- tetramethyldisiloxane) --, therefor.

Column 17
Line 27, Delete " 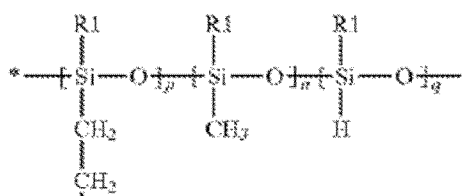 " and
insert -- 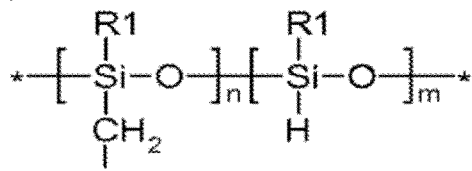 --, therefor.
Line 45, Delete "(R1 = CH3, Rf = C3F7)" and insert -- (R1 = $CH_3$, Rf = $C_3F_7$) --, therefor.
Line 61, Delete "$C_3F_{70}$" and insert -- $C_3F_7O$ --, therefor.

Column 19
Line 9, Delete "(R1 = CH₃, Rf = C₃F₇)" and insert -- (R1 = CH$_3$, Rf = C$_4$F$_9$) --, therefor.
Line 32, Delete "3 b:" and insert -- 3b: --, therefor.

Column 21
Line 34, Delete "Q2-7560"." and insert -- Q2-7560" --, therefor.
Line 35, Delete "vinylsilane)" and insert -- vinylsilane). --, therefor.

In the Claims

Column 24
Line 27, In Claim 7, delete "silcone" and insert -- silicone --, therefor.